(12) United States Patent
Uchida et al.

(10) Patent No.: US 6,870,984 B1
(45) Date of Patent: Mar. 22, 2005

(54) OPTICAL SWITCHING DEVICE COMPRISING PLURAL MECHANICAL OPTICAL SWITCHES

(75) Inventors: Yoshiaki Uchida, Mohka (JP); Fumio Nitanda, Fukaya (JP); Tomoki Soutome, Ohyadai-machi (JP); Shinji Furuichi, Mohka (JP)

(73) Assignee: Hitachi Metals, Ltd., Tokyo (JP)

( * ) Notice: Subject to any disclaimer, the term of this patent is extended or adjusted under 35 U.S.C. 154(b) by 158 days.

(21) Appl. No.: 10/151,938

(22) Filed: May 22, 2002

(30) Foreign Application Priority Data

Jun. 1, 2001 (JP) ........................................ 2001-166054
Oct. 25, 2001 (JP) ........................................ 2001-327928

(51) Int. Cl.[7] ............................................... G02B 6/26
(52) U.S. Cl. ........................................... 385/17; 385/16
(58) Field of Search ..................................... 385/16–23

(56) References Cited

U.S. PATENT DOCUMENTS

| | | | | |
|---|---|---|---|---|
| 4,318,587 A | * | 3/1982 | Grassl | 385/23 |
| 5,078,514 A | * | 1/1992 | Valette et al. | 385/20 |
| 5,268,975 A | * | 12/1993 | Yoshitani et al. | 385/22 |
| 5,483,608 A | * | 1/1996 | Yokomachi et al. | 385/22 |
| 5,828,800 A | * | 10/1998 | Henry et al. | 385/20 |
| 5,848,206 A | * | 12/1998 | Labeye et al. | 385/22 |
| 5,905,829 A | * | 5/1999 | Maenishi et al. | 385/59 |
| 6,169,826 B1 | | 1/2001 | Nishiyama et al. | 385/22 |
| 6,549,689 B2 | * | 4/2003 | Furuichi et al. | 385/16 |
| 6,647,168 B2 | * | 11/2003 | Hsu et al. | 385/16 |

FOREIGN PATENT DOCUMENTS

JP      6-208065     7/1994

OTHER PUBLICATIONS

U.S. Appl. No. 09/993,649, filed Nov. 27, 2001, Ueno.

* cited by examiner

*Primary Examiner*—Ellen E. Kim

(57) ABSTRACT

An optical switching device comprising a plurality of mechanical optical switching structures having one to several movable optical fibers and one to several fixed optical fibers installed in a housing in which a refractive index matching oil is filled up and immerses the structures. Each of the structures has an electromagnetic actuator to reciprocate open ends of the movable optical fibers relatively to open ends of the fixed optical fibers and to connect/disconnect optical paths. Ends opposite to the open ends of the movable optical fibers and the fixed optical fibers are drawn out through ports located on the housing so that a certain number of optical fibers among the optical fibers drawn out serve as input optical fibers, while a certain number of optical fibers among the other optical fibers drawn out serve as output optical fibers, to constitute the optical switching device of m×n type, in which m is the number of input paths and n is the number of output paths, providing a small-sized optical switching device having variable numbers of input/output paths.

4 Claims, 13 Drawing Sheets

OPTICAL SWITCHING DEVICE COMPRISING PLURAL MECHANICAL OPTICAL SWITCHES

BACKGROUND OF THE INVENTION

1. Field of the Invention

The present invention relates to an optical switch, and in particular, to a mechanical optical switching device having multiple input optical fibers and multiple output optical fibers.

2. Description of the Related Art

As for an optical switch for switching an optical path, those for switching a traveling direction of light by electrically changing a refractive index or phase of an optical path, switching a traveling direction of light by mechanically displacing an optical path, and so on have been developed. The mechanical optical switch has been often used in an optical communication apparatus, optical transmission apparatus, or the like because it has a low coupling loss of light, is substantially independent of the wavelength of the propagating light, and have a self-latching property for maintaining, even after removal of electric power, the coupling state of light in a state before the removal.

The mechanical optical switch comprises a movable optical fiber which can be elastically deformed and two fixed optical fibers, an open end of the movable optical fiber facing to open ends of the fixed optical fibers via an optical gap, and switches the optical path by displacing the open end of the movable optical fiber with respect to the open ends of the fixed optical fibers. In the mechanical optical switch, the movable optical fibers and the fixed optical fibers are usually used as input paths and output paths, respectively. A silicone based liquid or the like serving as a refractive index matching oil is placed between the open end of the movable optical fiber and those of the fixed optical fibers in order to prevent attenuation and scattering of light from occurring there. For that purpose, the whole mechanism of the optical switch is contained in an air-tight housing, and the housing is filled with the silicone based liquid or the like.

The fixed optical fibers are held by a fixed holder (fixed block) at portions close to their open ends. The movable optical fiber is held by a movable holder (movable block) at a portion close to its open end. The movable optical fiber is held by another fixed holder at a point distant from the tip of the movable optical fiber, and the point constitutes a fulcrum.

Since the open ends of the fixed optical fibers and the open end of the movable optical fiber are provided to face to each other, the fixed holder and the movable holder also face to each other. In order to displace the open end of the movable optical fiber with respect to the open ends of the fixed optical fibers, the movable holder is displaced with respect to the fixed holder. In order to keep such a movement within a certain route for avoiding misalignment when displacing the movable holder with respect to the fixed holder, guide pins are provided on one of the holders for example, fixed holder) to protrude from the facing surface thereof and are inserted into guide channels provided on the facing surface of the other holder (for example, movable holder). Thus, when the movable holder is displaced, the guide pins move along the guide channels, and the movable holder is stopped when the guide pins reach the ends of the guide channels.

An electromagnetic actuator is used to displace the movable holder or movable optical fiber with respect to the end of the fixed optical fiber, which is typically large in size. The movable holder or movable optical fiber is moved in the refractive index matching oil having viscosity, so that a significant magnitude of force is required. For that purpose, a large electromagnetic actuator is required. The housing of the optical switch is intended to contain the large electromagnetic actuator therein, so that it also becomes large in size. In addition, since the optical switch circuit includes a combination of many optical switches, if the individual optical switches are large, the optical switch circuit is also large.

U.S. Pat. No. 6,169,826 (issued on Jan. 2, 2001) has been proposed to reduce the size of an electromagnetic actuator used in an optical switch. The structure thereof will be described below with reference to FIGS. 10 and 11.

Referring to FIGS. 10 and 11, in an optical switch 800, fixed optical fibers 824 and movable optical fibers 822 are positioned so as to have their respective open ends faced to each other in a housing 810. The open ends of the movable optical fibers are moved relatively to the open ends of the fixed optical fibers to connect and/or disconnect optical paths. The fixed optical fibers are held by a fixed holder 832 made of soft magnetic ceramic at a portion close to the open ends thereof in the housing 810. The movable optical fibers 822 are supported and fixed in the housing 810 by another fixed holder 836 at a distance from the open ends thereof and are held by a movable holder 834 made of soft magnetic ceramic at a portion close to the open ends thereof. When the movable holder 834 made of soft magnetic ceramic is reciprocated with respect to the fixed holder 832 made of soft magnetic ceramic, the open ends of the movable optical fibers held by the movable holder 834 made of soft magnetic ceramic are reciprocated with respect to the tips of the fixed optical fibers 824 along with the movable holder 834 to connect and/or disconnect the optical paths.

An electromagnetic actuator 850 comprises an E-shaped yoke 852 having a back yoke (column yoke) 854 which is located on the side of the fixed optical fibers 824 from the fixed holder 832 made of soft magnetic ceramic in the housing, and first and second end legs 856 and 856' of the E-shaped yoke 852 extend from the back yoke 854 to the side surfaces of the movable holder 834 made of soft magnetic ceramic. The first and second end legs 856 and 856' have first and second pole pieces 858 and 858', respectively, which face the side surfaces of the movable holder 634 made of soft magnetic ceramic. The movable holder 834 made of soft magnetic ceramic can reciprocate between the first and second pole pieces 858 and 858'. A center leg 862 protruding from the center of the back yoke 854 toward the movable holder 834 made of soft magnetic ceramic is constituted by a permanent magnet 864 and the fixed holder 832 made of soft magnetic ceramic. For example, the permanent magnet 864 may be a sintered neodymium-iron-boron permanent magnet.

The permanent magnet 864 is magnetized in a direction from the fixed holder 832 made of soft magnetic ceramic to the back yoke 854 or in the direction opposite thereto. Part of the magnetic flux exiting from the permanent magnet 864 enters the first end leg 856 through the back yoke 854. Then, it enters the movable holder 834 made of soft magnetic ceramic via the first pole piece 858. Then, it passes through the fixed holder 832 made of soft magnetic ceramic to return to the permanent magnet 864. In this way, the permanent magnet 864, a first half of the back yoke 854, the first end leg 856, the first pole piece 858, the movable holder 834 and the fixed holder 832 constitute a first magnetic path. The magnetic flux of the permanent magnet passing through the first magnetic path is denoted by reference symbol A in this drawing.

Part of the magnetic flux exiting from the permanent magnet 864 enters the second end leg 856' through the back yoke 854. Then, it enters the movable holder 834 made of soft magnetic ceramic via the second pole piece 858'. Then, it passes through the fixed holder 832 made of soft magnetic ceramic to return to the permanent magnet 864. In this way, the permanent magnet 864, a second half of the back yoke 854, the second end leg 856', the second pole piece 868', the movable holder 834 and the fixed holder 832 constitute a second magnetic path. The magnetic flux of the permanent magnet passing through the second magnetic path is denoted by reference symbol B in this drawing.

FIG. 10 shows a state in which the movable holder 834 made of soft magnetic ceramic is attracted by the first pole piece 858, and there is a wider gap between the movable holder and the second pole piece 858'. The optical switch 800 comprises four fixed optical fibers 824 (denoted by reference symbols f1, f2, f3, and f4 from the left) and two movable optical fibers 822 (denoted by reference symbols m1 and n2 from the left). When the movable holder 834 made of soft magnetic ceramic is attracted by the first pole piece 858, the fixed optical fiber f1 and the movable optical fiber m1 have their open ends face each other, and the fixed optical fiber f3 and the movable optical fiber m2 have their open ends face each other, thereby establishing optical paths between them respectively. On the other hand, when the movable holder 834 made of soft magnetic ceramic is attracted by the second pole piece 858', optical paths are established between the fixed optical fiber f2 and the movable optical fiber m1, and between the fixed optical fiber f4 and the movable optical fiber m2. Displacing the movable holder 834 from the first pole pieces 858 to the second pole piece 858' can switch the position of the movable optical fiber m1 from the fixed optical fiber f1 to f2, and the position of the movable optical fiber m2 from the fixed optical fiber f3 to f4.

First and second coil members 872 and 872' are wound around the first and second end legs 856 and 856', respectively. When a current for canceling or decreasing the magnetic flux A is applied to the first coil member 872, and a current having a direction intended to increase the magnetic flux B is applied to the second coil member 872', the attraction between the movable holder 834 and the first pole piece 858 is vanished, and then the movable holder 834 is attracted to the second pole piece 858' to move toward the second pole piece 858'. When the movable holder 834 is attracted by the second pole piece 858', the optical paths are established in such a manner that the movable optical fiber m1 is connected to the fixed optical fiber f2 and the movable optical fiber m2 is connected to the fixed optical fiber f4. If the current applied to the first and second coil members 872 and 872' is stopped in this state, the state in which the movable holder 834 is attracted by the second pole piece 858' is maintained by the permanent magnet 864.

If a current for canceling or decreasing the magnetic flux B is applied to the second coil member 872', and a current for increasing the magnetic flux A is applied to the first coil member 872 when the movable holder 834 is attracted by the second pole piece 858', the movable holder 834 leaves the second pole piece 858' and moves toward the first pole piece 868. Then, as shown in FIG. 10, the movable optical fiber m1 is connected to the fixed optical fiber f1, and the movable optical fiber m2 is connected to the fixed optical fiber f3. If the current applied to the coil members 872 and 872' is stopped in this state, the connections are maintained.

In case of the electromagnetic actuator according to the above-described US patent, downsizing is realized by utilizing the movable holder 834 and fixed holder 832 both made of soft magnetic ceramic as part of the magnetic circuit of the electromagnetic actuator 850.

Since the fixed holder 832 is utilized as part of the magnetic circuit, however, most parts of the electromagnetic actuator 850 are provided on the side of the fixed optical fiber 824 in the optical switch 800. The length of the movable optical fiber 822 from its fulcrum to its open end is required to be enough for allowing a portion thereof from the fulcrum to the open end, in particular, to the point supported by the movable holder, to elastically pivot without undergoing an excessive force. For this reason, this portion of the movable optical fiber cannot be shortened.

Therefore, the optical switch has a length more than the sum of the length from the fulcrum to the open end of the movable optical fiber and the length of the electromagnetic actuator. The electromagnetic actuator includes the coil members. If the length of the electromagnetic actuator is reduced, the length of the coil member should also be reduced. Therefore, in order to ensure the same level of ampere-turn, the coil is rolled up to increase the number of overlap accordingly. As a result, the coil has an increased diameter.

The optical switch is provided on the bottom of a lower half 811 of the housing made of alumina ceramics or the like and is covered by the upper half 812 of the housing from the above, and a gap between the lower half and the upper half is sealed to provide the air-tight housing 810 as shown in FIG. 11 in a perspective view. Refractive index matching oil is filled into the housing 810 through its inlet 817 which is closed thereafter so that the mechanical optical switching structures are completely immersed in the refractive index matching oil.

The assignee of this invention proposed in U.S. patent application Ser. No. 09/993,649 (filed Nov. 27, 2001) an optical switch further smaller than that proposed in the US patent. The optical switch 900 will be described below, referring to FIG. 12.

Fixed optical fibers 924 near their open ends are fixed by a fixed holder 932 attached to a base plate 915 near a housing side wall. Movable optical fibers 922 are fixed, at a distance from the open ends thereof, to the base plate 915 by another fixed holder 936 attached to the base plate 915. The latter fixed holder 936 is arranged near another housing side wall having a slot 913 passing the movable optical fibers 922 therethrough. A movable holder 934 made of soft magnetic material is provided on the base plate 915 so as to face the fixed holder 932, holds the movable optical fibers 922 near the open ends thereof, and reciprocates relatively to the fixed holder 932 on the base plate 915, thereby connecting and/or disconnecting, or switching, the open ends of the fixed optical fibers and the open ends of the movable optical fibers. Providing a gap between the movable holder 934 of soft magnetic material and the base plate 915, such as a glass plate, allows the movable holder 934 to move smoothly.

In order to reciprocate the movable holder 934 made of soft magnetic material relatively to the fixed holder 932, an electromagnetic actuator 950 is located in an area on the side of the movable optical fibers 922 from the open ends of the movable optical fibers in the housing 910. That is, the electromagnetic actuator 950 is provided between the front end of the movable holder 934 near the fixed holder 932 and the rear end of the fixed holder 936 (that is, the end of the fixed holder 936 near the housing side wall on the side of the movable optical fiber).

As shown in FIG. 12, the electromagnetic actuator 950 has an E-shaped yoke 952, which has two end legs 956, 956' and a center leg 962. The E-shaped yoke 952 has a back yoke 954, and the end leg 956 extends from one end of the back yoke 954 to a position where it faces one side surface of the movable holder 934 of soft magnetic material. The end leg 956' extends from the other end of the back yoke 954 to a position where it faces the other side surface of the movable holder 934 of soft magnetic material. The end legs 956 and 956' have pole pieces 958 and 958', respectively, each of which faces a side surface of the movable holder 934.

The end leg 956 and the half of the back yoke 954 on the side of the end leg 956 may be collectively referred to as a first yoke. The end leg 956' and the half of the back yoke 954 on the side of the end leg 956' may be collectively referred to as a second yoke. The pole piece 958 attached to the end leg 956 may be referred to as a first pole piece, the pole piece 958' attached to the end leg 956' may be referred to as a second pole piece.

The movable holder 934 has gaps between the first pole piece 958 and one side surface of the movable holder 934 and between the second pole piece 958' and the other side surface of the movable holder 934, respectively, so as to reciprocate between the first and second pole pieces 958 and 968'.

A permanent magnet 964 and a soft magnetic material block 966 are provided on the center leg 962 attached to the back yoke 954 of the E-shaped yoke 952, and the center leg 962 extends toward the movable holder 934. The permanent magnet 964 is magnetized in a direction from the soft magnetic material block 966 to the back yoke 954, or in the direction opposite thereto. The permanent magnet 964 may be a sintered neodymium-iron-boron permanent magnet. Part of the magnetic flux exiting from the permanent magnet 964 enters the end leg 956 through the back yoke 954. Then, it enters the movable holder 934 made of soft magnetic material via the first pole piece 958. Then, it passes through the soft magnetic material block 966 to return to the permanent magnet 964. In this way, the permanent magnet 964, the first half of the back yoke 954, the end leg 956, the first pole piece 958, the movable holder 934 and the soft magnetic material block 966 constitute a first magnetic path. The magnetic flux of the permanent magnet passing through the first magnetic path is denoted by reference symbol A in the drawing.

Part of the magnetic flux exiting from the permanent magnet 964 enters the end leg 956' through the back yoke 954. Then, it enters the movable holder 934 made of soft magnetic material via the second pole piece 958'. Then, it passes through the soft magnetic material block 966 to return to the permanent magnet 964. In this way, the permanent magnet 964, the second half of the back yoke 954, the end leg 956', the second pole piece 958', the movable holder 934 and the soft magnetic material block 966 constitute a second magnetic path. The magnetic flux passing through the second magnetic path is denoted by reference symbol B in the drawing.

A first coil member 972 and a second coil member 972' are wound around the end legs 956 and 956', respectively. The first and second coil members 972 and 972' are connected in series in such a manner that when a DC voltage is applied between their respective terminals 976 and 976', the two coil members 972 and 972' generate magnetic fields of directions opposite to each other. When a current for canceling or decreasing the magnetic flux A is applied to the first coil member 972, and a current having a direction intended to increase the magnetic flux B is applied to the second coil member 972', the attraction between the movable holder 934 and the first pole piece 958 is vanished, and then the movable holder 934 is attracted to the second pole piece 958' to move toward the second pole piece 958'. In the state in which the movable holder 934 is attracted by the second pole piece 958', the optical paths are established in such a manner that the movable optical fiber m1 is connected to the fixed optical fiber f2 and the movable optical fiber m2 is connected to the fixed optical fiber f4. If the current applied to the first and second coil members 972 and 972' is stopped in this state, the state in which the movable holder 934 is attracted by the second pole piece 958' is maintained by the permanent magnet 964.

If a current for canceling or decreasing the magnetic flux B is applied to the second coil member 972', and a current for increasing the magnetic flux A is applied to the first coil member 972 when the movable holder 934 is attracted by the second pole piece 958', the movable holder 934 leaves the second pole piece 958' and moves toward the first pole piece 958. Then, the movable optical fiber m1 is connected to the fixed optical fiber f, and the movable optical fiber m2 is connected to the fixed optical fiber f3. If the current applied to the coil members is stopped in this state, the connections are maintained.

The optical switches described in U.S. Pat. No. 6,169,826 and U.S. patent application Ser. No. 09/993,649 have electromagnetic actuators provided in an air-tight housing, which actuators move movable optical fibers at the input side to switch the optical paths. The movable optical fibers are immersed in a refractive index matching oil and, when moving the movable optical fibers, they receive viscous resistance of the refractive index matching oil. Since a large driving force is required for the reason that elastic resistance of the optical fiber becomes large when the number of movable optical fibers increases, a large-sized electromagnetic actuator is also required when the number of movable optical fibers increases. Hence, with respect to the optical switch, if expressed by a ratio of the number of input optical fibers and the number of output optical fibers, a ratio of the number of inputs and the number of outputs is 1:2 or 2:4, that is, those of a 1×2 type or a 2×4 type are used in large quantities.

However, in order to switch the optical paths, the optical switch having the number of optical fibers which match the number of paths presently used is required and a 4×8 type or a larger type is also required. There are often cases where, in order to construct any m×n optical switches, the optical switches having a small number of input optical fibers and a small number of output optical fibers such as the 1×2 type, the 2×4 type are combined plurally in use. Such an example is disclosed in Japanese Patent Laid-Open No. 6-208065 (JP 6-208065 A). Illustrated there is a 1×8 type optical switch, which was fabricated by combining seven 1×2 type optical switches in three stages.

When the 1×8 type optical switch is fabricated according to JP 6-208065 A by using a plurality of the 1×2 type optical switches disclosed in the above described U.S. Pat. No. 6,169,826 and U.S. patent application Ser. No. 09/993,649, it forms a combination shown in FIG. 13 in a plane view. In the same drawing, reference numeral 800 denotes the 1×2 type optical switch, and an input signal enters the 1×2 type optical switch located at the first stage from the input optical fiber. The output of the ×2 type optical switch of this first stage is connected to the input optical fibers of the two 1×2 type optical switches located at the second stage. Each of outputs of the 1×2 type optical switches of the second stage is connected to the input optical fibers of the four 1×2 type optical switches located at the third stage. Since the output optical fibers of the 1×2 type optical switches of the third stage are eight in total, it is obvious that the 1×8 type optical switch is constructed by the seven 1×2 type optical switches.

Because of the requirement to downsize the optical switch circuits, efforts are made to downsize individual 1×2 optical switches. Nevertheless, the 1×8 type optical switch fabricated in this way by combining the seven 1×2 type optical switches are large in size.

SUMMARY OF THE INVENTION

It is therefore an object of the invention to provide an optical switching device which is small-sized in whole, while the device comprises multiple mechanical optical switching structures having one to several input optical fibers and one to several output optical fibers.

Another object of the invention is to provide an optical switching device with variable numbers of input/output optical fibers.

A further object of the invention is to prevent an electromagnetic interference between electromagnetic actuators of a plurality of mechanical optical switching structures used in combination.

An optical switching device according to the invention comprises an air-tight housing, a plurality of mechanical optical switching structures installed in the housing and a refractive index matching oil filled up in the housing to immerse the plurality of mechanical switching structures. In the device, each of the plurality of mechanical optical switching structures comprises one to eight fixed optical fibers having open ends, one to four movable optical fibers having open ends movable relatively to the open ends of the fixed optical fibers and an electromagnetic actuator which reciprocates the open ends of the movable optical fibers relatively to the fixed optical fiber open ends to connect/disconnect optical paths composed of the fixed and the movable optical fibers. Each of ends opposite to the open ends of the movable optical fibers and the fixed optical fibers are drawn out or extended through ports located on the housing. A certain number of optical fibers among the optical fibers drawn out serve as input optical fibers for the device, while a certain number of optical fibers among the optical fibers drawn out serve as output optical fibers for the device, constituting the optical switching device of m×n type, in which m is the number of input paths or input optical fibers and n is the number of output paths or output optical fibers.

In the optical switching device of the invention, ends opposite to the open ends of one to several fixed optical fibers among the fixed optical fibers of a mechanical optical switching structure may be connected, in the housing, to ends opposite to the open ends of one to several movable optical fibers among the movable optical fibers of another mechanical optical switching structure or to ends opposite to the open ends of one to several fixed optical fibers among the fixed optical fibers of another mechanical optical switching structure. In the optical switching device of the invention, ends opposite to the open ends of one to several movable optical fibers among the movable optical fibers of a mechanical optical switching structure may be connected, in the housing, to ends opposite to the open ends of one to several movable optical fibers among the movable optical fibers of another mechanical optical switching structure. Furthermore, in the housing of the optical switching device, ends opposite to the open ends of one to several movable optical fibers among the movable optical fibers of a mechanical optical switching structure may be connected to ends opposite to the open ends of one to several fixed optical fibers among the fixed optical fibers of the same mechanical optical switching structure or to ends opposite to the open ends of one to several movable optical fibers among the movable optical fibers of the same mechanical optical switching structure. Ends opposite to the open ends of one to several fixed optical fibers among the fixed optical fibers of a mechanical optical switching structure may be connected, in the housing, to ends opposite to the open ends of one to several fixed optical fibers among the fixed optical fibers of the same mechanical optical switching structure. The connection between the ends of the optical fibers may be accomplished by splicing.

In the optical switching device of the invention, ends opposite to the open ends of the movable and the fixed optical fibers in the housing except for those connected or spliced to one another at their ends are drawn out or extended through ports located on the housing side wall. Ends of one to several optical fibers among the optical fibers drawn out of the housing through the ports of the housing side wall may be connected to ends of one to several other optical fibers.

Each of the mechanical optical switching structure used in the optical switching device of the invention has one to eight fixed optical fibers and one to four movable optical fibers. In order for each of the mechanical optical switching structures to work with a small electromagnetic actuator, it is desirable that the number of the movable optical fibers is reduced. Also, to make the mechanical optical switching structures as simple as possible, they are preferably a 1×2 type or a 2×4 type.

It is preferable that the plurality of mechanical switching structures used in the optical switching device of the invention are arranged in parallel to each other in the housing and that each of the structures is in antiparallel to a neighboring structure. Alternatively, it is preferable that the neighboring mechanical switching structures used in the optical switching device of the invention are arranged in parallel to each other in the housing and that an electromagnetic shield is interposed between the electromagnetic actuators of the neighboring mechanical switching structures.

DETAILED DESCRIPTION OF THE PREFERRED EMBODIMENTS

Optical switching devices according to EXAMPLES of the invention will be described with reference to the drawings.

EXAMPLE 1

Figure 1:
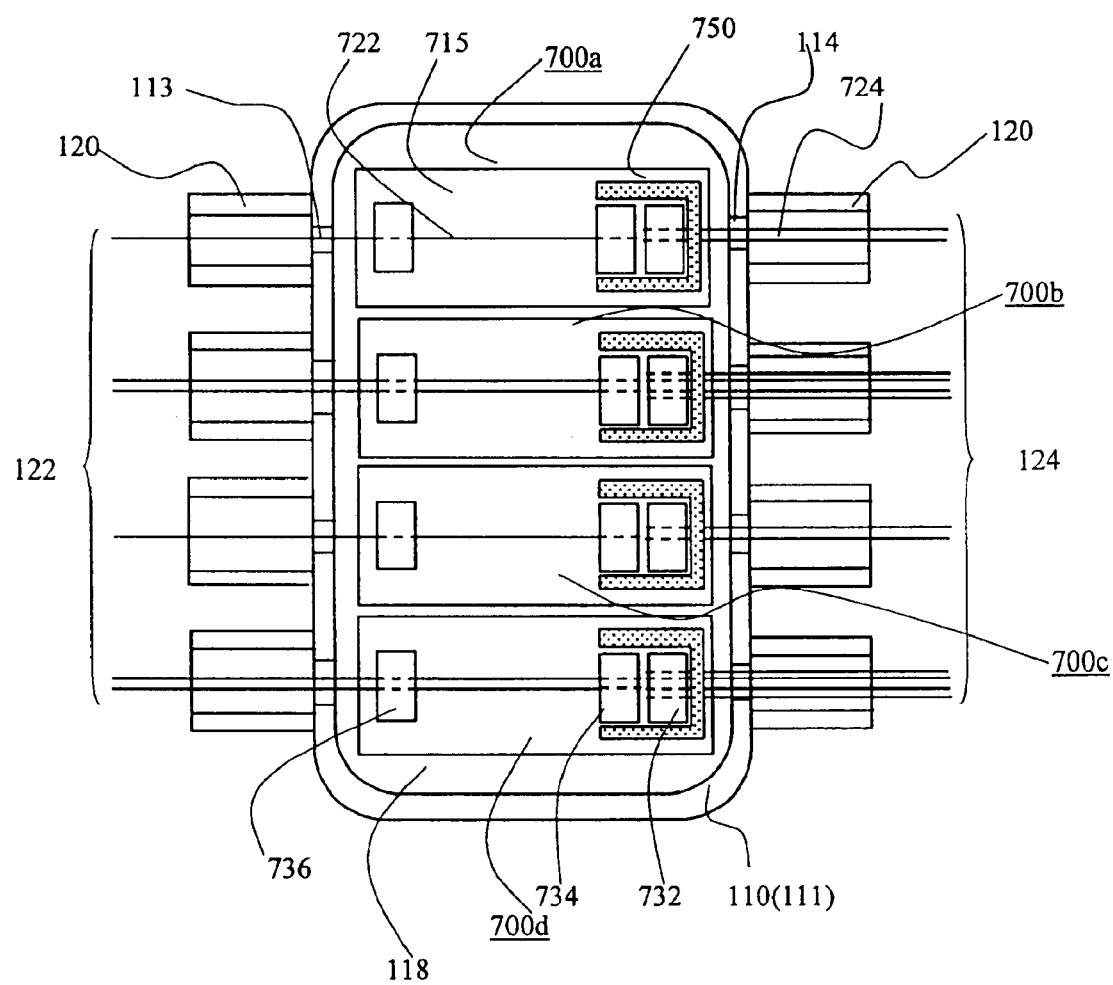
FIG. 1 is a plan view of an optical switching device of EXAMPLE 1 according to the invention, with an upper half of a housing removed.
Figure 2:
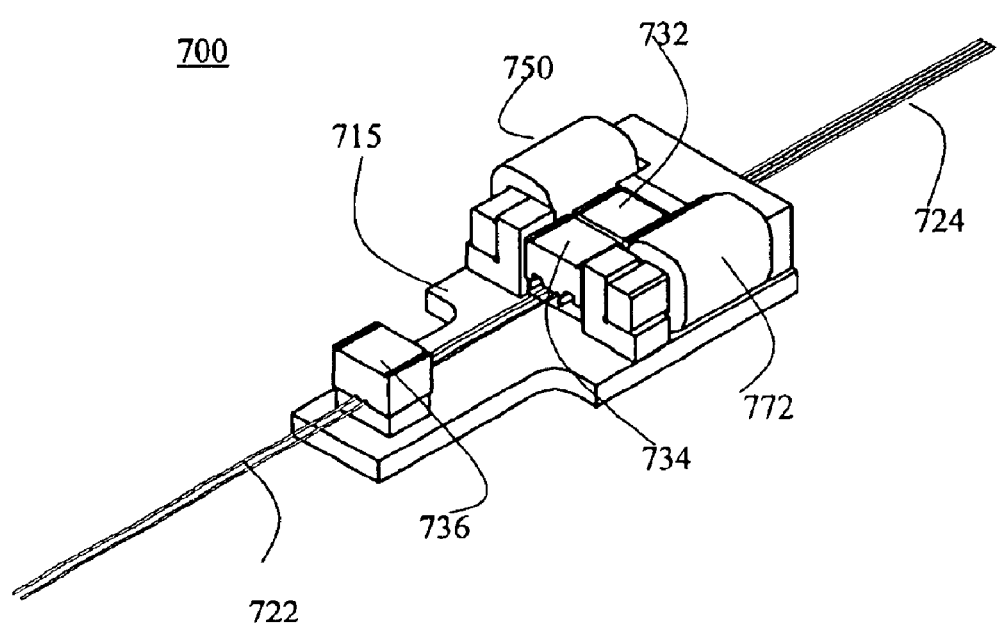
FIG. 2 is a perspective view of a mechanical optical switching structure used in EXAMPLE 1 of the invention.
Figure 3:
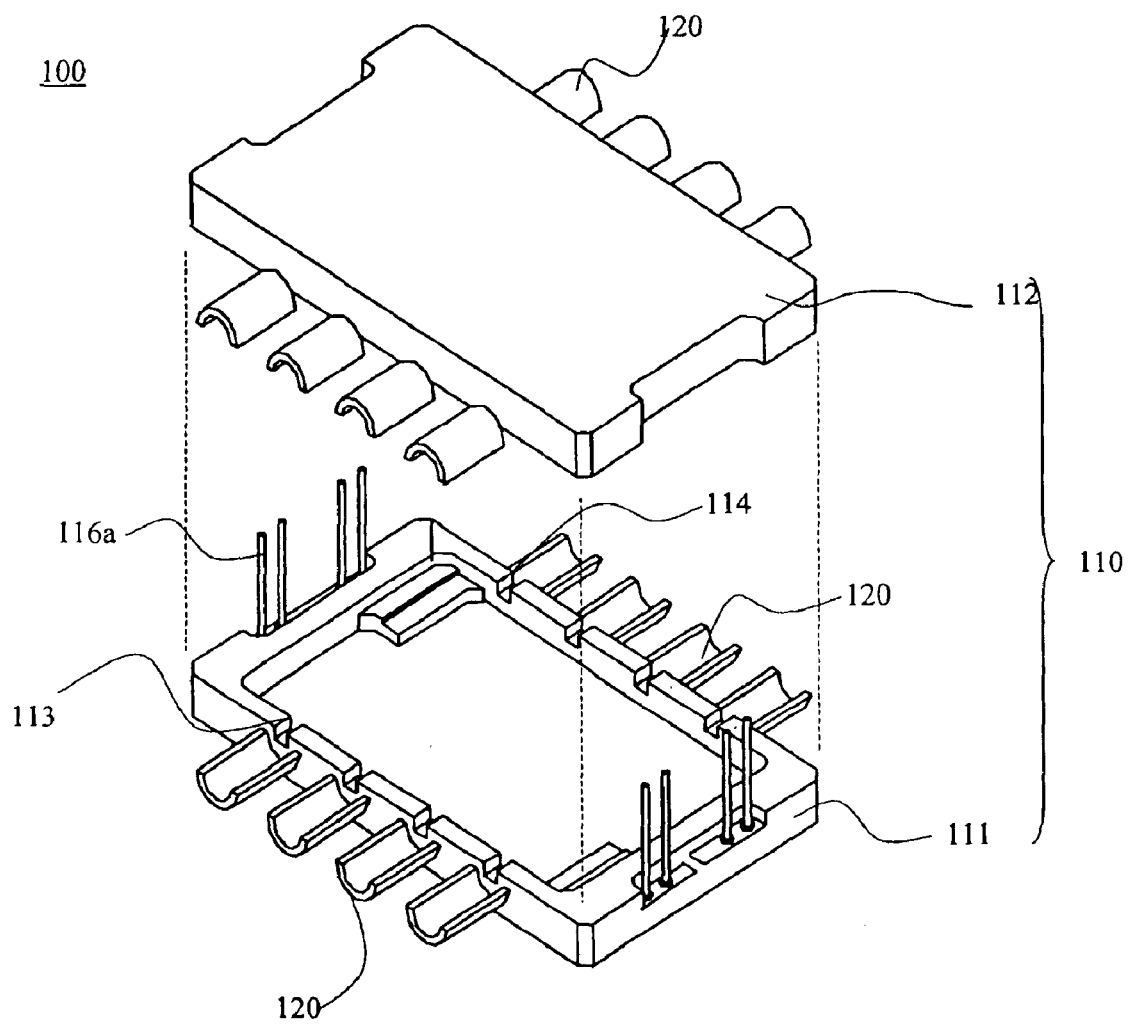
FIG. 3 is an exploded perspective view of a housing used in EXAMPLE 1 of the invention.
Figure 4:
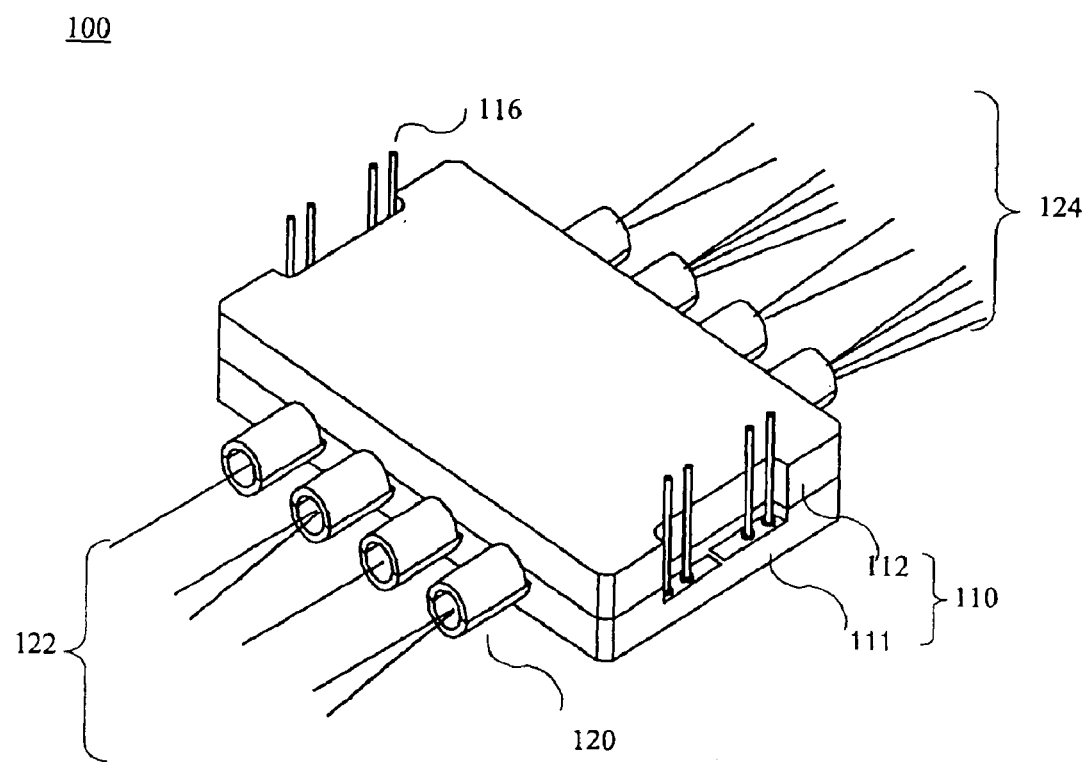
FIG. 4 shows a perspective view of the optical switching device of EXAMPLE 1 of the invention.

An optical switching device 100 according to EXAMPLE 1 of the invention is shown in FIGS. 1 through 4. FIG. 1 shows the optical switching device 100 and is a plan view of a state of an upper half of an air-tight housing 110 removed, FIG. 3 is an exploded perspective view of the housing 110, and FIG. 4 is a perspective view of the optical switching device 100.

As can be seen by these drawings, the optical switching device 100 has the housing 110 made of alumina ceramics or the like. The housing 110 is covered by an upper half 112 which is a lid on a lower half 111 having a bottom, and is sealed. A gap between the lower half 111 and the upper half 112 is bonded by butting portions of surrounding walls.

A total of four sets of optical switching structures by summing two 1×2 type mechanical type optical switching structures 700 and two 2×4 type mechanical optical switching structures 700 are placed in parallel on the bottom of the housing 110. A movable optical fiber of each mechanical optical switching structure 700 is drawn outside of the housing 110 through an opening opened at the left side wall or a groove 113. A fixed optical fiber is drawn outside the housing 110 through the opening opened at the right side wall of the housing 110 or a groove 114. The openings opened at the housing or the grooves 113, 114 are sealed by synthetic resin bond after passing the optical fibers. Cylindrical supports which surround each opening 113, 114 are attached on housing wall surfaces, and both the opening and the cylindrical support constitute a port 120. Insertion of the bond into the port 120 allows the optical fibers passing there to be held. The movable optical fibers 722 of the four mechanical optical switching structures 700 drawn outside the housing from the housing port 120 constitute input optical fibers 122. The fixed optical fibers 724 of the four mechanical optical switching structures 700 drawn outside the housing from the housing port 120 constitute output optical fibers 124. The optical switching device 100 shown in the drawing has six input paths and 12 output paths, thereby constituting a 6×12 type.

Here, the output optical fibers 124 can be used as the input paths, and the input optical fibers 122 can be used as the output paths. Alternatively, the two fixed optical fibers 724 of a mechanical optical switching structure 700a are connected to the two movable optical fibers of an optical switching structure 700b, respectively outside of the housing, thereby making it possible to reduce both the number of input paths and the number of output paths by two each and, moreover, the two fixed optical fibers of an optical switching structure 700c are connected to the two movable optical fibers of an optical switching structure 700d, respectively outside of the housing, thereby making it possible also to reduce both the number of input paths and the number of output paths by two each. In this way, it is possible to constitute the optical switching device of a 4×10 type or a 2×8 type.

Alternatively, the two fixed optical fibers of the optical switching structure 700a are connected to two among the four fixed optical fibers of the optical switching structure 700b, and the two fixed optical fibers of the optical switching structure 700c are connected to the remaining two among the four fixed optical fibers of the optical switching structure 700b so as to use the movable optical fibers of the optical switching structures 700a, 700c, and 700d as the input paths, and the movable optical fiber of the optical switching structure 700b and the fixed optical fiber of the optical switching structure 700d as the output paths, thereby constituting this optical switching device as a 4×6 type.

In the housing 110 of the optical switching device 100, the fixed optical fibers of an optical switching structure can be connected to the movable optical fibers of another optical switching structure, and the fixed optical fibers of an optical switching structure can be connected to the fixed optical fibers of another optical switching structure, or the movable optical fibers of an optical switching structure can be connected to the movable optical fibers of another optical switching device. Alternatively, in the housing 110 of the optical switching device 110, the fixed optical fibers of an optical switching structure can be connected to the movable optical fibers of the same optical switching structure, the fixed optical fibers of an optical switching structure can be connected to the fixed optical fibers of the same optical switching structure, or the movable optical fibers of an optical switching structure can be also connected to the movable optical fibers of the same optical switching structure. Further, in case of necessity, ends of some fixed optical fibers or some movable optical fibers may be let opened. In this way, the input paths and the output paths can be changed variously.

The optical switching device 100 has four optical switching structures 700a–d, which are provided in parallel arrangement on the bottom of the air-tight housing 110, the housing 110 has refractive index matching oil filled 118 therein, and each optical switching structure is immersed in the refractive index matching oil 118, and an open end gap between the movable optical fibers and the fixed optical fibers located at each optical switching structure is also filled with the refractive index matching oil. Each of the optical switching structures 700a–d has a structure as shown in FIG. 2 in a perspective view, and they can have the same structure of the optical switch shown in FIGS. 10 and 12.

The optical switching structures 700a–d have the open ends of the movable optical fibers 722 positioned so as to face to the open ends of the fixed optical fibers 724 in the electromagnetic actuators 750 provided on a base plate 715 made of glass and the like. Each base plate 715 of the optical switching structures 700a–d is bonded and fixed on a bottom of the lower half of the housing. The movable optical fiber open ends relatively move with respect to the open ends of the fixed optical fibers 724, thereby connecting/disconnecting the optical paths. The fixed optical fibers are held on the base plate 715 by a fixed holder 732 near the open ends. The movable optical fibers 722 are supported by another fixed holder 736 fixed on the base plate at a distance from the open ends of the movable optical fibers 722, and the movable optical fibers are held by a movable holder 734 comprising a soft magnetic material, for example, soft magnetic ceramics near the open ends. The movable holder 734 is reciprocated with respect to the fixed holder 732, so that the movable optical fiber open ends held by the movable holder 734 are reciprocated together with the movable holder relatively to the tips of the fixed optical fibers 724, thereby connecting/disconnecting the optical path.

Since the electromagnetic actuator 750 may have the same structure as described with reference to FIGS. 10 and 12, there will be no need to describe in detail a structure and an operation thereof. Note, however, that the movable holder 734 is driven depending on the direction of the current let flow to a coil member 722, thereby connecting/disconnecting the optical paths.

Figure 10:
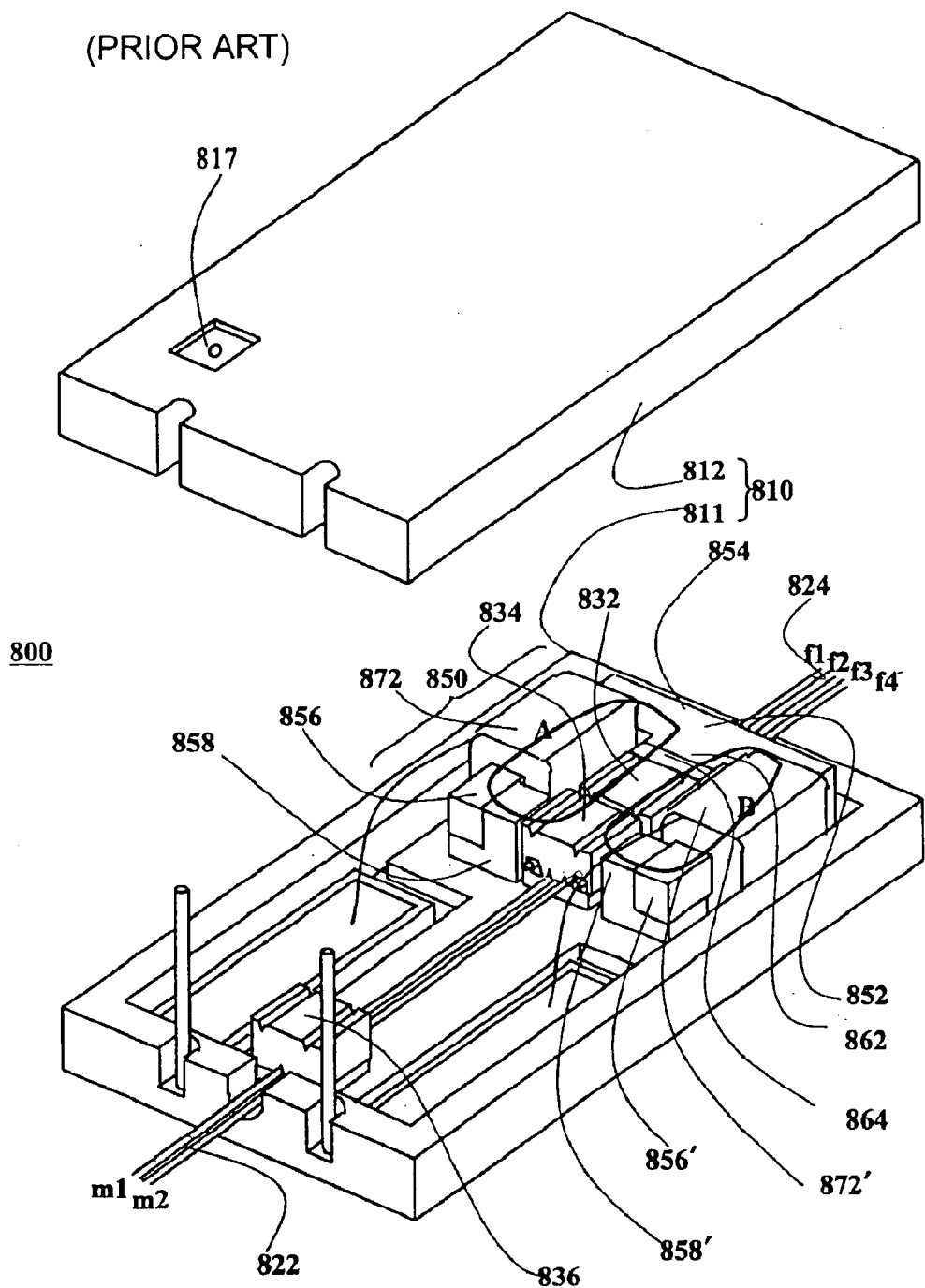
FIG. 10 is an exploded perspective view of an optical switch described in U.S. Pat. No. 6,169,826.
Figure 11:
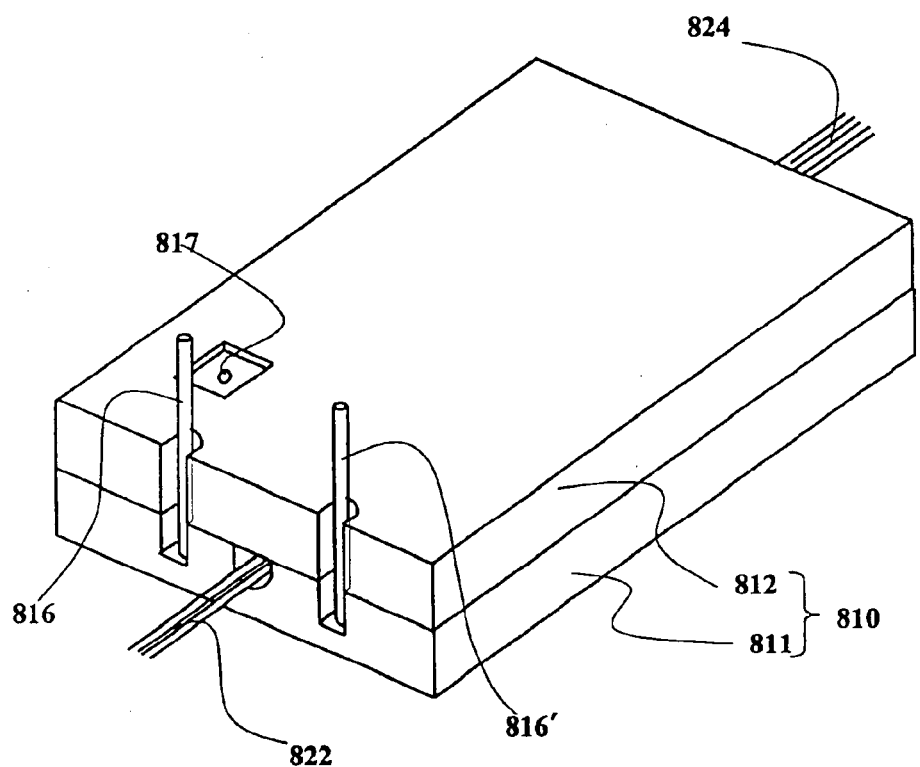
FIG. 11 is a perspective view of the optical switch of FIG. 10.
Figure 12:
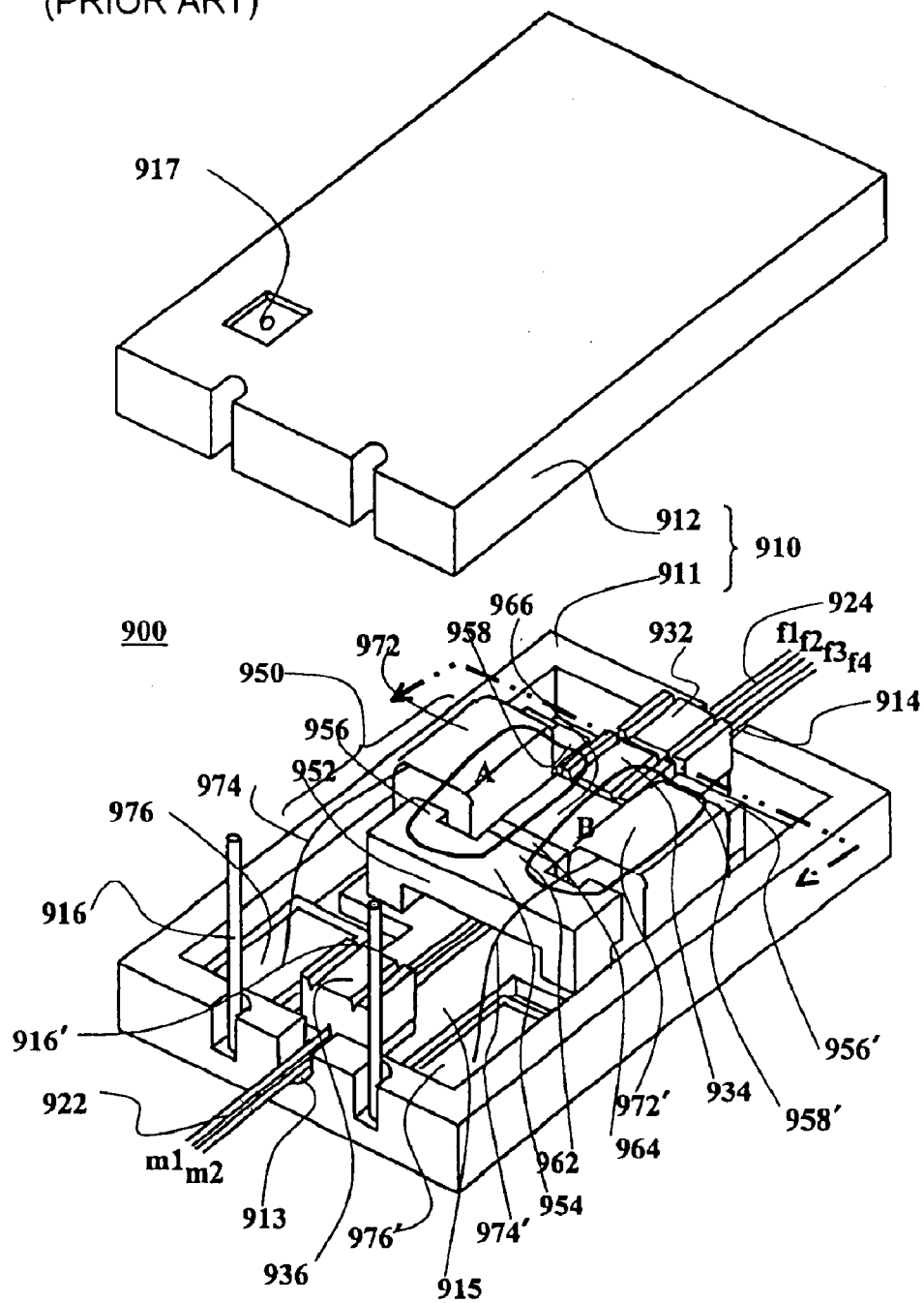
FIG. 12 is an exploded perspective view of an optical switch described in a US patent application.
Figure 13:
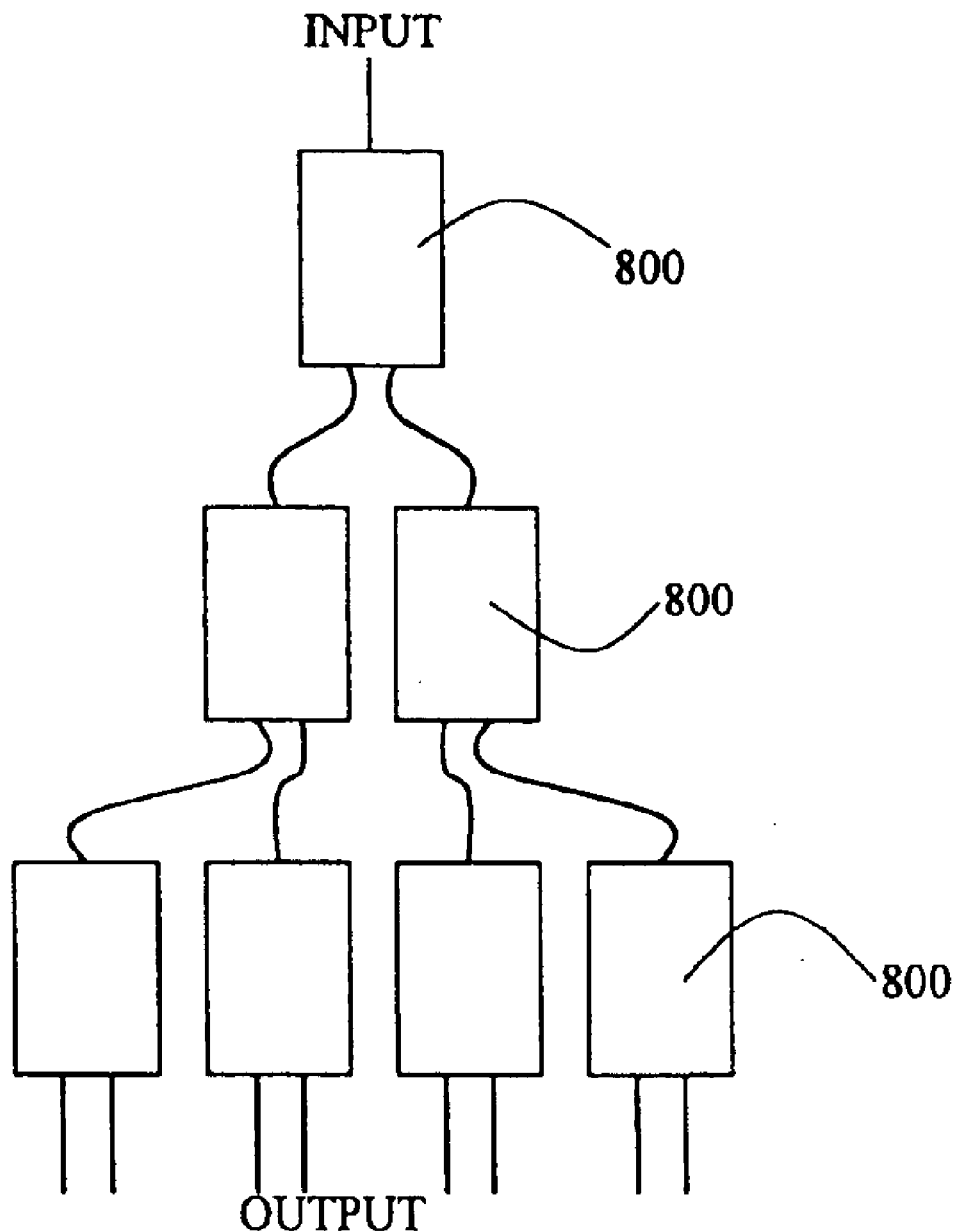
FIG. 13 is a plan view of a combination of optical switches described in a prior reference, JP 6-208065 A.

In case of the optical switch shown in FIGS. 10 and 12, each optical switching structure is provided in the optical switch housings 810, 910, while in case of the optical switching device 100 according to the invention, four of the optical switching structures 700a–d are provided in one set of the housing 110. For this reason, there exists no housing wall between the optical switching structures, and the optical switching structures are provided in close vicinity to each other. In contrast to the case where four conventional optical switches are used, the optical switching device 100 according to the invention having the four optical switching structures is small in its occupied area.

As shown in FIG. 1, when the four optical switching structures are arranged in parallel, the electromagnetic actuators 750 of adjacent optical switching structures are also located in close vicinity to each other and, therefore, it is necessary to set the distance between them at such a pitch so that no electromagnetic interference is caused between the electromagnetic actuators.

EXAMPLE 2

Figure 5:
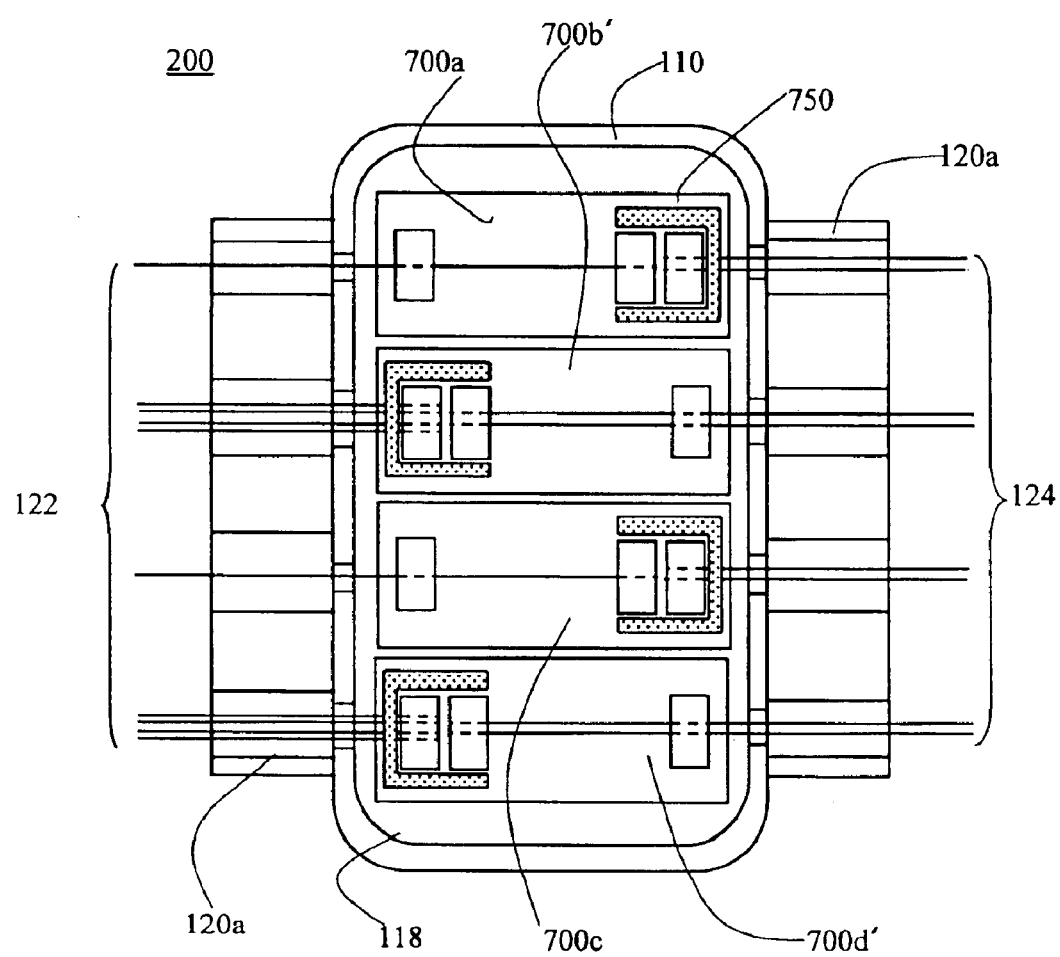
FIG. 5 is a plan view of an optical switching device of EXAMPLE 2 according to the invention, with an upper half of a housing removed.

An optical switching device 200 according to EXAMPLE 2 of the invention is shown in FIG. 5 in a plan view of a state of the upper half of the housing 110 removed. This optical switching device 200 has a 1×2 type optical switching structure 700a, a 2×4 type optical switching structure 700b', a 1×2 type optical switching structure 700c and a 2×4 type optical switching structure 700d' arranged in parallel in the optical switch housing 110. The adjacent optical switching structures are in anti-parallel to each other. The optical fibers drawn outside of the housing from the port 120a located on the left side wall in the drawing are ten in total, and the optical fibers drawn outside of the housing from the port 120a located on the right side wall are eight in total. If the optical fibers extended outside from the left side port serve as input paths, and the optical fibers extended outside from the right side port as output paths, this optical switching device can constitute a 10×8 type.

Since the adjacent optical switching structures are in anti-parallel to each other, that is, in the directions opposite to neighboring structures, as can be seen from the drawing, the position of the electromagnetic actuator located in each optical switching structure is apart from each other and does not abut against each other. For this reason, there is no risk of electromagnetic interference being caused between the electromagnetic actuators of the adjacent optical switching structures.

As is evident from the comparison of FIG. 5 with FIG. 1, the port 120a of the optical switching structure 200 is integrally formed by four ports. Since the port is metal-bonded and assembled on the position corresponding to the housing wall, when a plurality of ports are integrated as shown by this EXAMPLE, an assembling labor thereof can be saved.

EXAMPLE 3

Figure 6:
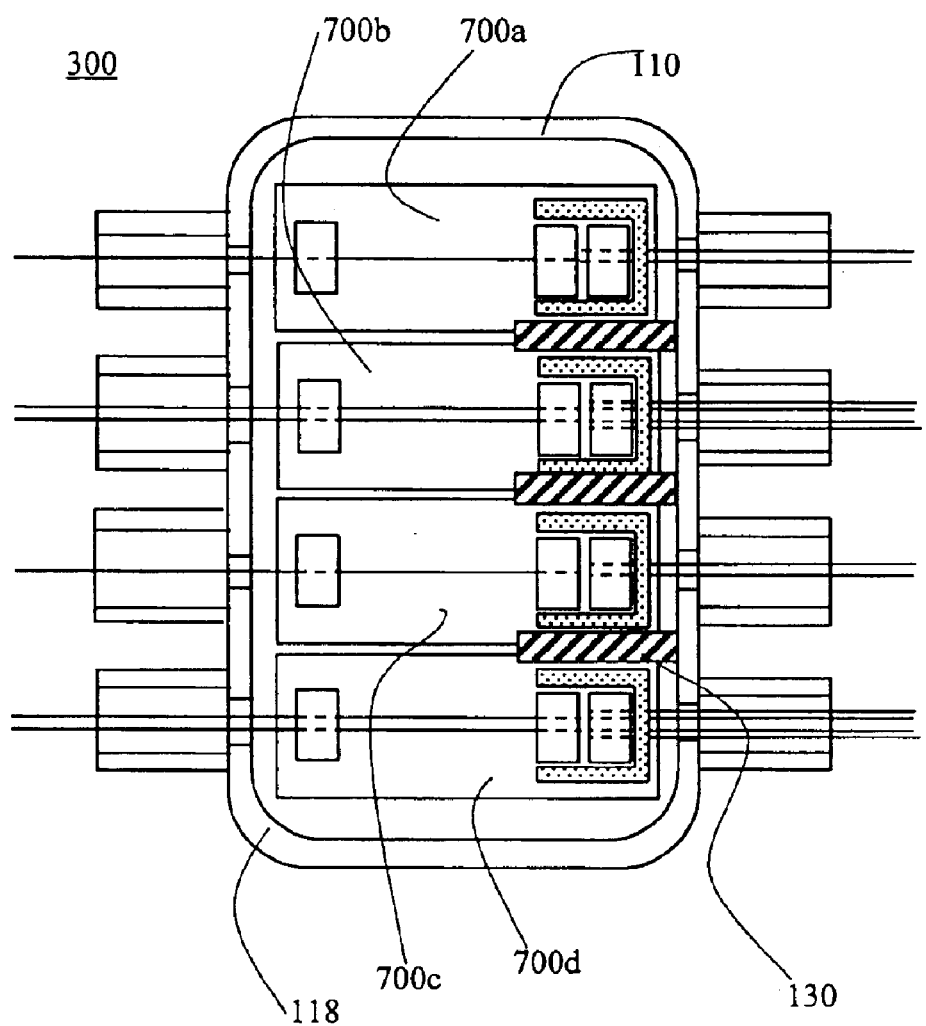
FIG. 6 is a plan view of an optical switching device of EXAMPLE 3 of the invention, with an upper half of a housing removed.

An optical switching device 300 according to EXAMPLE 3 of the invention is shown in FIG. 6 in a plan view of a state of the upper half of the housing 110 removed. This optical switching device 300 has, similarly to EXAMPLE 1, four optical switching structures 700a–d arranged in parallel in the optical switch housing. Electromagnetic shield plates 130 are interposed among the electromagnetic actuators of the neighboring optical switching structures and the electromagnetic interference is prevented among them. As the electromagnetic shield plate 130, nickel iron alloy having a thickness of 0.3 mm and single crystal of Mn—Zn ferrite having a thickness of 0.9 mm can be used. In the case where the electromagnetic shield plate made of single crystal of Mn—Zn ferrite is interposed between the electromagnetic actuators, even when the interval between the neighboring optical switching structures is 1 mm or less, there occurred no electromagnetic interference. In addition, employment of the electromagnetic shield plate made it possible to reduce the amount of refractive index matching oil to be filled in the housing.

EXAMPLES 4 and 5

Figure 7:
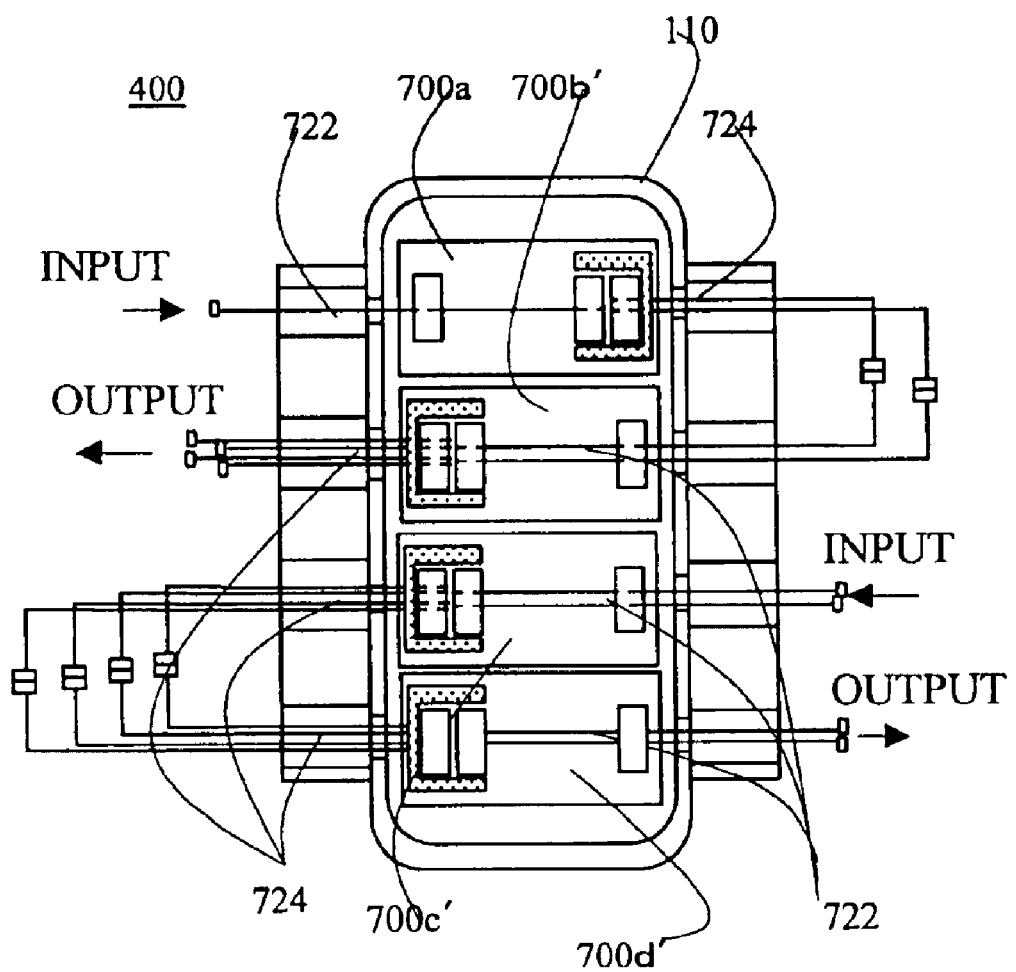
FIG. 7 is a plan view of an optical switching device of EXAMPLE 4 of the invention, with an upper half of a housing removed.
Figure 8:
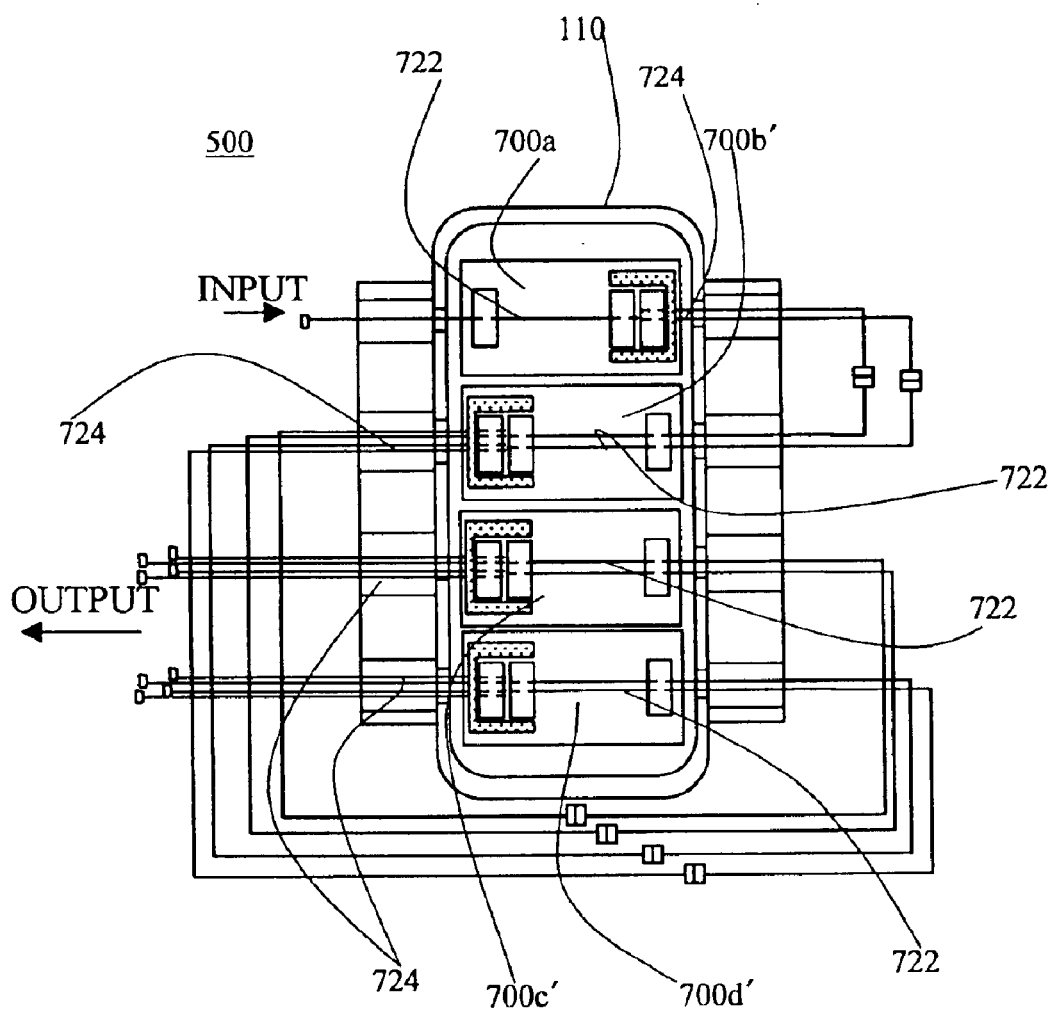
FIG. 8 is a plan view of an optical switching device of EXAMPLE 5 of the invention, with an upper half of a housing removed.

An optical switching device 400 according to EXAMPLE 4 and an optical switching device 500 according to EXAMPLE 5 of the invention are shown respectively in FIGS. 7 and 8 in a plan view of a state of the upper half of the housing 110 removed. Although the optical switching devices 400 and 500 are the same as the optical switching device 200 of EXAMPLE 2, in replacement of the optical switching structure 700c of the optical switching device 200, the 2×4 type optical switching structure 700c' is provided between the optical switching structures 700b' and 700d' and arranged in parallel to them.

In the optical switching device 400, two fixed optical fibers 724 of the 1×2 type optical switching structure 700a are connected to two movable optical fibers 722 of the 2×4 type optical switching structure 700b', respectively. When movable optical fibers 722 of the 1×2 type optical switching structure 700a serve as input paths, four fixed optical fibers 724 of the 2×4 type optical switching structure 700b' serve as output paths, so that the 1×4 type optical device is constituted at this portion. Four fixed optical fibers 724 of the 2×4 type optical switching structure 700c' are connected to four fixed optical fibers 724 of the 2×4 type optical switching structure 700d', respectively. When two movable optical fibers 722 of the 2×4 type optical switching structure 700c' serve as input paths, two movable optical fibers 722 of the 2×4 type optical switching structure 700d' serve as output paths, so that a 2×2 type optical switching device is constituted at this portion. The optical switching device 400 constitutes a 3×6 type as a whole.

In the optical switching device 500, two fixed optical fibers 724 of the 1×2 type optical switching structure 700a are connected to two movable optical fibers 722 of the 2×4 type optical switching structure 700b', respectively. Two among four fixed optical fibers 724 of the 2×4 type optical switching structure 700b' are connected to two movable optical fibers 722 of the 2×4 type optical switching structure 700c', and the remaining two of the four fixed optical fibers 724 of the 2×4 type optical switching structure 700b' are connected to the two movable optical fibers 722 of the 2×4 type optical switching structure 700d'. Fixed optical fibers 724 of the 2×4 type optical switching structures 700c' and 700d' constitute output paths of the optical switching device 500, while a movable optical fiber 722 of the 1×2 type optical switching structure 700a constitutes input path. Hence, this optical switching device 500 constitutes a 1×8 type as a whole.

EXAMPLE 6

Figure 9:
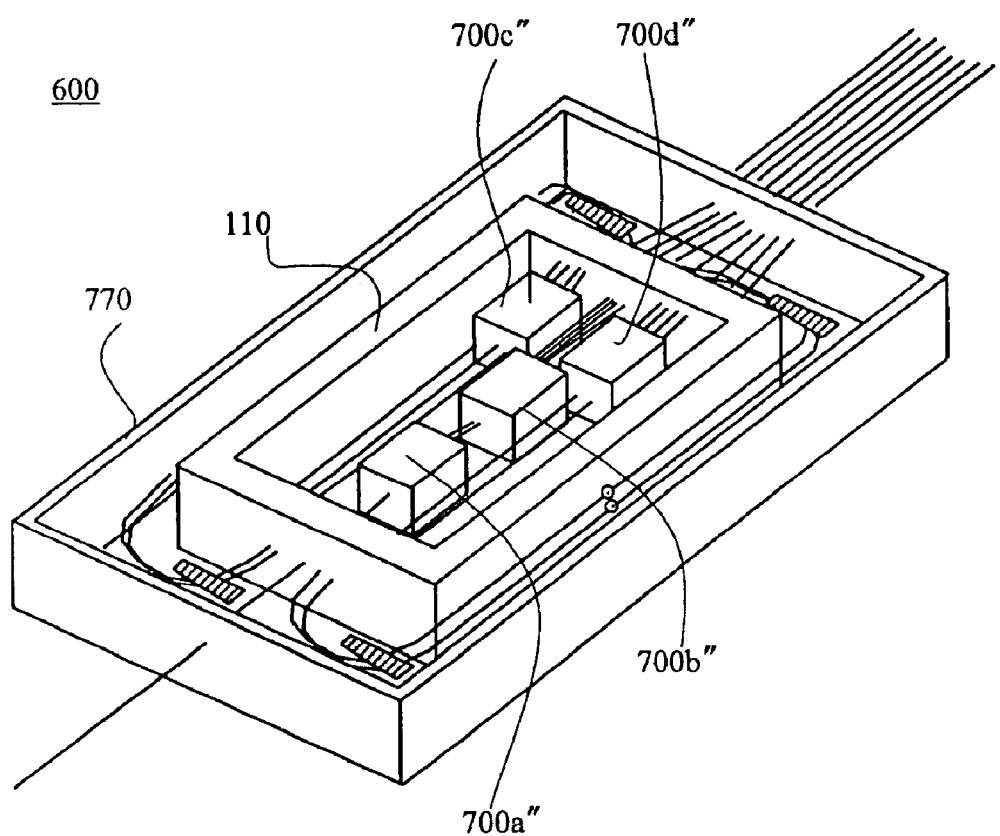
FIG. 9 is a plan view of an optical switching device of EXAMPLE 6 of the invention, with an upper half of a housing removed.

An optical switching device 600 of still another example of the invention is shown in FIG. 9 in a perspective view removing an upper half of the housing 110. The optical switching device 600 has a 1×2 type optical switching structure 700a", a 2×4 type optical switching structure 700b", a 2×4 type optical switching structure 700c" and a 2×4 type optical switching structure 700d" in the housing 110. A movable optical fiber of the 1×2 type optical switching structure 700a" passes through a front wall of the housing 110 and come outside of the housing 110, and fixed optical fibers of the 1×2 type optical switching structure 700a" are connected to movable optical fibers of the 2×4 type optical switching structure 700b" in the housing. Fixed optical fibers of the 2×4 type optical switching structure 700b" pass through a rear wall of the housing 110 and come outside of the housing 110. Two each of movable optical fibers of the 2×4 type optical switching structures 700c" and 700d" pass through the front wall of the housing 110 and are drawn outside of the housing 110, and four each of fixed optical fibers thereof pass through the rear wall of the housing 110 and are drawn outside of the housing 110. Two among the four fixed optical fibers of the 2×4 type optical switching structure 700b" are connected to the two movable optical fibers of the 2×4 type optical switching structure 700c" outside of the housing 110, and the remaining two among the four fixed optical fibers of the 2×4 type optical switching structure 700b" are connected to the two movable optical fibers of the 2×4 type optical switching structure 700d" outside of the housing 110. The movable optical fiber of the 1×2 type optical switching structure 700a" serves as input path of the optical switching device 600, and a total sum of eight of the fixed optical fibers of the 2×4 type optical switching structures 700c" and 700d" serve as output paths of the optical switching device 600, so that the optical switching device 600 constitutes the 1×8 type. The optical switching device 600 of this EXAMPLE arranges the housing 110 and the connecting portions of the optical fibers in a fiber protection case 770 and fixes the housing and the optical fibers in the protection case, so that the optical switching device can be easily handled.

What is claimed is:

1. An optical switching device of m×n type, comprising:
   an air-tight housing;
   a plurality of mechanical optical switching structures installed in the housing;
   a refractive index matching oil filled up in the housing to immerse the plurality of mechanical optical switching structures; and
   each of the mechanical optical switching structures comprising one to eight fixed optical fibers having open ends, one to four movable optical fibers having open ends movable relatively to the open ends of the fixed optical fibers and an electromagnetic actuator which reciprocates the open ends of the movable optical fibers relatively to the open ends of the fixed optical fibers to connect/disconnect optical paths;
   wherein ends opposite to the open ends of the movable optical fibers and the fixed optical fibers are drawn out though ports located on the housing to constitute "m" input and "n" output paths; and
   wherein the plurality of the mechanical optical switching structures are arranged in parallel to each other in the housing and each of the mechanical optical switching structures is in antiparallel to a neighboring mechanical optical switching structure.

2. An optical switching device as set forth in claim 1, wherein each of the mechanical optical switching structures is 1×2 type or 2×4 type.

3. An optical switching device of m×n type, comprising:
   an air-tight housing;
   a plurality of mechanical optical switching structures installed in the housing;
   a refractive index matching oil filled up in the housing to immerse the plurality of mechanical optical switching structures; and
   each of the mechanical optical switching structures comprising one to eight fixed optical fibers having open ends, one to four movable optical fibers having open ends movable relative to the open ends of the fixed optical fibers and an electromagnetic actuator which reciprocates the open ends of the movable optical fibers relative to the open ends of the fixed optical fibers to connect/disconnect optical paths;
   wherein ends opposite to the open ends of the movable optical fibers and the fixed optical fibers are drawn out through ports located on the housing to constitute "m" input and "n" output paths; and
   wherein the plurality of the mechanical optical switching structures are arranged in parallel to each other in the housing and an electromagnetic shield is interposed between the electromagnetic actuators of the neighboring mechanical optical switching structures.

4. An optical switching device as set forth in claim 3, wherein each of the mechanical optical switching structures is 1×2 type or 2×4 type.

* * * * *

UNITED STATES PATENT AND TRADEMARK OFFICE
CERTIFICATE OF CORRECTION

PATENT NO. : 6,870,984 B1
DATED : March 22, 2005
INVENTOR(S) : Yoshiaki Uchida et al.

It is certified that error appears in the above-identified patent and that said Letters Patent is hereby corrected as shown below:

<u>Title page,</u>
Insert Item -- [65] Prior Publication Date
    US 2005/0063640 A1 March 24, 2005 --.
Item [75], Inventor, delete "Ohyadai-machi" and insert -- Mohka --.

Signed and Sealed this

Twenty-fifth Day of April, 2006

JON W. DUDAS
*Director of the United States Patent and Trademark Office*